(12) United States Patent
Church

(10) Patent No.: US 8,348,542 B2
(45) Date of Patent: Jan. 8, 2013

(54) CONNECTION SYSTEM FOR TUBULAR MEMBERS

(75) Inventor: Kris L. Church, Montgomery, TX (US)

(73) Assignee: Gandy Technologies Corporation, Conroe, TX (US)

( * ) Notice: Subject to any disclaimer, the term of this patent is extended or adjusted under 35 U.S.C. 154(b) by 0 days.

(21) Appl. No.: 13/089,064

(22) Filed: Apr. 18, 2011

(65) Prior Publication Data

US 2011/0227331 A1  Sep. 22, 2011

Related U.S. Application Data

(63) Continuation-in-part of application No. 12/422,753, filed on Apr. 13, 2009, now abandoned.

(51) Int. Cl.
 *F16D 33/00* (2006.01)
 *E04B 1/32* (2006.01)
(52) U.S. Cl. ...... 403/296; 405/135; 403/314; 403/359.6
(58) Field of Classification Search .................. 403/292, 403/293, 296, 298, 314, 305, 359.3, 359.6, 403/359.1; 285/314, 332, 332.1, 332.3
 See application file for complete search history.

(56) References Cited

U.S. PATENT DOCUMENTS

| | | | | |
|---|---|---|---|---|
| 1,381,805 | A * | 6/1921 | Crewdson | 403/359.1 |
| 1,469,304 | A * | 10/1923 | Hughes | 403/305 |
| 2,005,498 | A * | 6/1935 | Hart | 403/296 |
| 2,056,309 | A * | 10/1936 | Osenberg | 411/453 |
| 2,089,168 | A * | 8/1937 | Brown | 403/259 |
| 2,297,390 | A * | 9/1942 | Burger | 403/350 |
| 3,476,413 | A * | 11/1969 | Brown et al. | 285/332.3 |
| 4,068,346 | A * | 1/1978 | Binder | 16/110.1 |
| 4,598,922 | A * | 7/1986 | Kleinebenne et al. | 280/279 |
| 5,470,166 | A * | 11/1995 | Sundberg et al. | 403/314 |
| 5,987,287 | A * | 11/1999 | Huang | 399/265 |
| 6,243,994 | B1 * | 6/2001 | Bernini | 52/86 |
| 6,406,220 | B1 * | 6/2002 | Thomson | 405/132 |
| 6,547,479 | B2 * | 4/2003 | Dowling et al. | 403/359.2 |
| 6,604,885 | B1 * | 8/2003 | Neuner | 403/359.2 |
| 6,692,207 | B1 * | 2/2004 | Bailey | 411/180 |
| 6,892,042 | B2 * | 5/2005 | Jang et al. | 399/167 |

* cited by examiner

*Primary Examiner* — Joshua Kennedy
(74) *Attorney, Agent, or Firm* — Charles D. Gunter, Jr.

(57) ABSTRACT

A tubular connector system for joining two pipe ends without the necessity of rotating the pipe ends. A coupling has opposing tapered ends. Each of the tapered ends slopes inwardly from an inner extent to an outer extent to form a respective mouth opening of the body. Each tapered end of the coupling has a contoured surface which is made up of a series of alternating helical spline wedges. The wedges are oppositely tapered from an inner extent to an outer extent, whereby the helical spline wedges form an alternating series of lands and grooves on the body as viewed from the respective mouth openings. The two opposing pipe ends have mating engagement surfaces which engage and mate with the contoured surfaces of the coupling as one pipe end is pushed toward the other during assembly.

7 Claims, 7 Drawing Sheets

CONNECTION SYSTEM FOR TUBULAR MEMBERS

CROSS REFERENCE TO RELATED APPLICATIONS

The present application is a continuation-in-part of earlier filed Ser. No. 12/422,753, filed Apr. 13, 2009, entitled "Connection System For Tubular Members", by the same inventor.

BACKGROUND OF THE INVENTION

1. Field of the Invention

This invention relates in general to methods and apparatus for joining pipe ends and in particular to methods and apparatus for joining pipe ends without the necessity of rotating the pipe or, where desired, with only a slight rotation of one pipe relative to the other.

2. Description of the Prior Art

There are a number of applications for joining pipe ends in which it would be desirable to join the ends without the necessity of rotating the respective pipes themselves. One example would be in the oil industry, and particularly in the area of offshore production. On a drilling rig, rotation of one pipe end relative to the other is typically accomplished either by use of a hydraulic power tong which requires a specialized crew to operate, or a more basic "rope technique" consisting of pulling on a soft rope from the drilling rig main winch capstan. Final make-up torque is achieved by using a mechanical tong. The maximum amount of rotation achieved in one stroke of such a mechanical tong/cathead chain assembly is approximately one-quarter to one-third of a turn without the necessity of having to reset the assembly by manual reverse rotation. Production pipelines, on the other hand, have often been welded together in the past.

A suitable push-together connection would have advantages in off shore applications, for example, by providing the ability of being able to make-up and disconnect underwater connections remotely.

Also, a push-together connection would be simple to implement and would eliminate costly welding operations which have become almost prohibitive in some situations due to the high hourly cost of offshore operations.

There are other applications where, for example in construction, oil and gas and mining, where a slight rotation of one or both of the pipes being joined may be acceptable. Such a connection system could have application for drive pipe, riser pipe, conduit and casing liners for oil and gas operations, for example.

One way that the oil industry has attempted to address the problem of creating a secure pipe connection, particularly in joining offshore casing and tubing, was by introducing a specialized generation of thread connectors using modified A.P.I. threads. These threaded connectors are still widely used today, for example, for dimensions below twenty-four inches, despite the general requirement of a minimum of two and one-half turns of rotation for make-up.

A threadless connector for large diameter casings has also been used in the past which was based upon a snap-ring linkage type mechanism. These "snap-ring" type connectors offer fast make-up but offer neither the low weight-to-capacity ratio, nor the integrity or price competitiveness of the threaded connector for a given capacity.

Another type connector featuring radial dogs was introduced to replace flange connections, in a mechanical configuration for drilling riser connections, and in a hydraulic configuration for wellhead connections. Recently, the use of dog type connectors has been extended to offshore platform anchoring pile connections, but its success has been limited by its high cost, due to the large number of parts and the relatively heavy section required in the design and manufacture of such a connector.

In addition to the oil industry, numerous other applications exist for joining tubular pipe ends. For example, tubular pipe connections are used in a variety of civil engineering applications, including their utilization in providing structural support in the construction field. One such use of tubular pipes can be found in the building of underground tunnels. More specifically, tubular pipes provide support to large underground tunnels that are typically used as roadways or other transportation means. The large scale construction of underground tunnels for transportation applications is presently underway in Europe, Japan and elsewhere.

In a typical procedure to construct an underground tunnel, a large pipe, or possibly several large pipes, is laid by a boring machine and forms the main tunnel. Next, a boring machine proceeds to lay relatively smaller curved pipes surrounding the main tunnel to provide additional structural support These small curved pipes are commonly constructed as 10 foot sections having, for example, a 32 inch outer diameter. It is then necessary to connect these individual sections to provide a single, lengthier curved pipe adjacent to the underground structure. The process is repeated, placing these connected pipe sections parallel to one another for the duration of the desired length along the main tunnel, creating in effect a "whalebone" configuration surrounding the main tunnel. The voids in and around the pipes will be subsequently filled with concrete. In an application such as an underground roadway that reaches upwards to 12 miles, somewhere on the order of 80,000 connections would be needed to couple the individual pipe sections together to provide enough support to adequately enlarge the surrounding area of the main pipe.

Various techniques have been provided at the present time for connecting these individual curved tunnel pipe sections where the pipe sections themselves cannot be rotated. As with the offshore oil industry, one technique presently used in many situations, is to join two or more of these pipe sections together by welding, either by hand welding or semi-automatic welding processes. Welding is a time consuming activity, at best. Also, there is the possibility of defects in the welds and poor workability of the resulting materials due to heating of the metal. In low temperatures, countermeasures such as the preheating are necessary. In general, a welding process can take somewhere from 2 to 5 hours to weld one connection for a tunnel pipe section, depending on the size or complexity of the connection. With this in mind, time constraints virtually eliminate the practicality of welding each coupling in large projects consisting of thousands of pipe sections of the type under consideration.

Another technique which has been proposed for joining pipe ends, where the pipes themselves cannot be rotated, is the use of the so-called "adhesion joint." This method injects, for example, an acrylic adhesive into the clearance of the joint interval, after which a post-line tube is inserted. It is possible to carry out the construction in a shorter time than the welding method, but the adhesive may not be applied uniformly, resulting in compromised connections. The adhesives may be messy to apply and may not furnish the required strength for some connection applications.

U.S. Pat. No. 4,487,433, issued Dec. 11, 1984, to Miller, shows an anti-rotation coupling wherein similarly pitched and profiled, but oppositely threaded ends, are provided for two couplings incorporating an anti-rotation member such as a tongue and groove or a hole and dowel pin. The patent seems to be primarily concerned with keeping the pipes anti-rotational once the connection is assembled, however.

U.S. Pat. No. 4,846,508, issued Jul. 11, 1989, to Pallini, Jr. Et al., shows a tubular connector system for joining two pipe ends without the necessity of rotating the pipe ends. One pipe end is provided with an external thread and a second pipe end includes multiple thread lead entries. A special tubular connector is also provided which includes an internal thread at one end and internal multiple thread lead entries at the other end. The tubular connector is first threaded onto the first pipe. Next, the second pipe is stabbed into the second end of the tubular connector and the tubular connector is then rotated less than a single turn with respect to the second pipe to fully mate the tubular connector and the second pipe. It appears that the connector is screwed all the way in on a first pipe end and is then "backed-off" a slight amount as the second pipe end is screwed in (rotated less than a single turn). Even this slight amount of rotation would not be acceptable in many of the applications discussed above, however.

A need exists, therefore, for an improved method and apparatus for joining tubular pipe ends, which method does not require the rotation of one pipe section relative to another, or which requires only slight rotation of one of the pipes.

SUMMARY OF THE INVENTION

The present invention effectively provides an apparatus and method to connect tubular pipe sections without the necessity of rotating the pipe sections themselves, which thereby overcomes various of the problems discussed with respect to the prior art, as will become apparent to those skilled in the art from the detailed description which follows. Alternatively, if desired, the two pipe sections can be joined with only a partial rotation of one of the sections.

A preferred version of the connector system of the invention includes a push-together coupling for joining two pipe sections without the necessity of rotating the pipe sections. The coupling includes a coupling body having a first tapered end and a second tapered end joined together at a respective inner extent thereof, each of the tapered ends sloping inwardly from the inner extent to an outer extent thereof to thereby form a respective mouth opening of the body.

In one version of the connector system of the invention, each of the first and second tapered ends of the coupling body has a specially contoured exterior surface, the exterior surface being comprised of a plurality of helical spline wedges. Each of the helical spline wedges is oppositely tapered in width from an inner extent to an outer extent thereof, whereby the helical spline wedges form an alternating series of lands and grooves on the exterior surface of the body as viewed from the respective mouth openings. The first and second tapered ends of the coupling body are sized to be received on mating surfaces provided on respective ends of the two pipe sections to be joined to engage the respective pipe ends by axial movement of one pipe relative to another.

The helical spline wedges are arranged on the exterior surface of the coupling along a dominant axis, the dominant axis being longitudinal or axial rather than helical. An assembly force is applied to the coupling and respective pipe ends. The assembly force causes the coupling to rotate less than 360° before the pipes are fully connected. The pipes which are being joined together may be arranged to form a relatively straight line when assembled, as in a typical oil and gas pipeline or offshore pipeline or riser. Alternatively, the pipe sections may be arranged along a curved axis when assembled, as in the case of an underground tunnel support structure. The exterior surfaces of the coupling may also be specially treated, as by roughening, so that the connection assembles with a required degree of force, but resists disassembly due to the action of the specially treated surfaces engaging mating surfaces of the connection.

In another version of the connector system of the invention, the specially contoured surfaces on the coupling and on the respective ends of the two pipe sections to be joined are essentially reversed. That is, the coupling has the specially contoured surfaces on each of the oppositely arranged interior surfaces thereof. Likewise, the pipe ends to be joined are "pin" ends having mating specially contoured exterior surfaces.

The push-together coupling previously described can be used as a part of a tubular connector system for joining two pipe ends where a first pipe end is provided having a box end or pin end as described and a second pipe end is provided similarly having a box end or pin end as described. The first and second tapered ends of the coupling are shaped to mate with the specially machined surfaces provided on the opposing pipe ends, respectively, to engage the respective pipe ends by axial movement only of one pipe relative to another.

In the method of assembling a pipe connection of the invention with only axial movement of the pipe ends, a first and second pipe end to be joined are provided as previously described. The first end of the coupling is threadedly engaged with the first pipe end until the coupling is supported on the first pipe end. The pipe end of the second pipe is then engaged with the second end of the coupling and the second pipe is pushed axially with respect to the coupling and the first pipe, whereby the coupling rotates relative to the respective pipe ends and secures the pipe ends together without the necessity of both of the respective pipe ends rotating.

In yet another version of the tubular connection system of the invention, two pipe sections can be joined with only a partial rotation of one of the pipe sections being joined. The pipe assembly includes a first pipe having a first tapered end with an inner extent and an outer extent. The tapered end slopes inwardly from the inner extent to the outer extent thereof to thereby form a respective mouth opening of the first pipe. The first pipe tapered end has a specially contoured engagement surface, the engagement surface being comprised of a plurality of helical spline wedges, each of which is oppositely tapered from an inner extent to an outer extent thereof in width, whereby the helical spline wedges form an alternating series of lands and grooves as viewed from the mouth opening.

The second pipe to be connected also has a specially contoured engagement surface on an outer extent thereof, the second pipe engagement surface being sized to be matingly engaged with the first pipe engagement surface, whereby the respective pipe ends may be joined by axial movement of one pipe relative to another. The axial movement of one pipe relative to another causes a slight rotation of one pipe relative to another. Preferably, the rotation of one pipe relative to another is less than one complete turn, most preferably less than one half of a complete turn.

The specially contoured surfaces on the first pipe end can be provided, for example, on the exterior of the first pipe end, and wherein the second pipe end is a box end. Alternatively the specially contoured surfaces on the first pipe end can be on the interior of the first pipe end, and wherein the second pipe end is a pin end. In both versions of this system of the invention, the helical spline wedges are arranged on the specially contoured surface of the pipe along a dominant axis, the dominant axis being longitudinal rather than helical.

In this alternative version of the method of joining two pipe ends of the invention with partial rotation, the first and second pipes are provided with the specially contoured engagement surfaces, as previously described. The first pipe end is brought into engagement with the second pipe end. A selected one of the first and second pipes is then pushed axially with respect to the other respective pipe, thereby securing the pipe ends together. An assembly force is thus applied to a selected one of the pipes in order to form a connection between the two pipes, and wherein the assembly force causes one of the pipes to rotate less than 360° before the pipes are fully connected.

This version of the tubular connection system of the invention has particular applicability to tubular goods of the type used in construction, oil and gas and mining. The tubular goods can be used to join drive pipe, riser pipe, conduit and casing liners for oil and gas production, for example.

Additional objects, features and advantages will be apparent in the written description which follows.

DETAILED DESCRIPTION OF THE INVENTION

Figure 1:
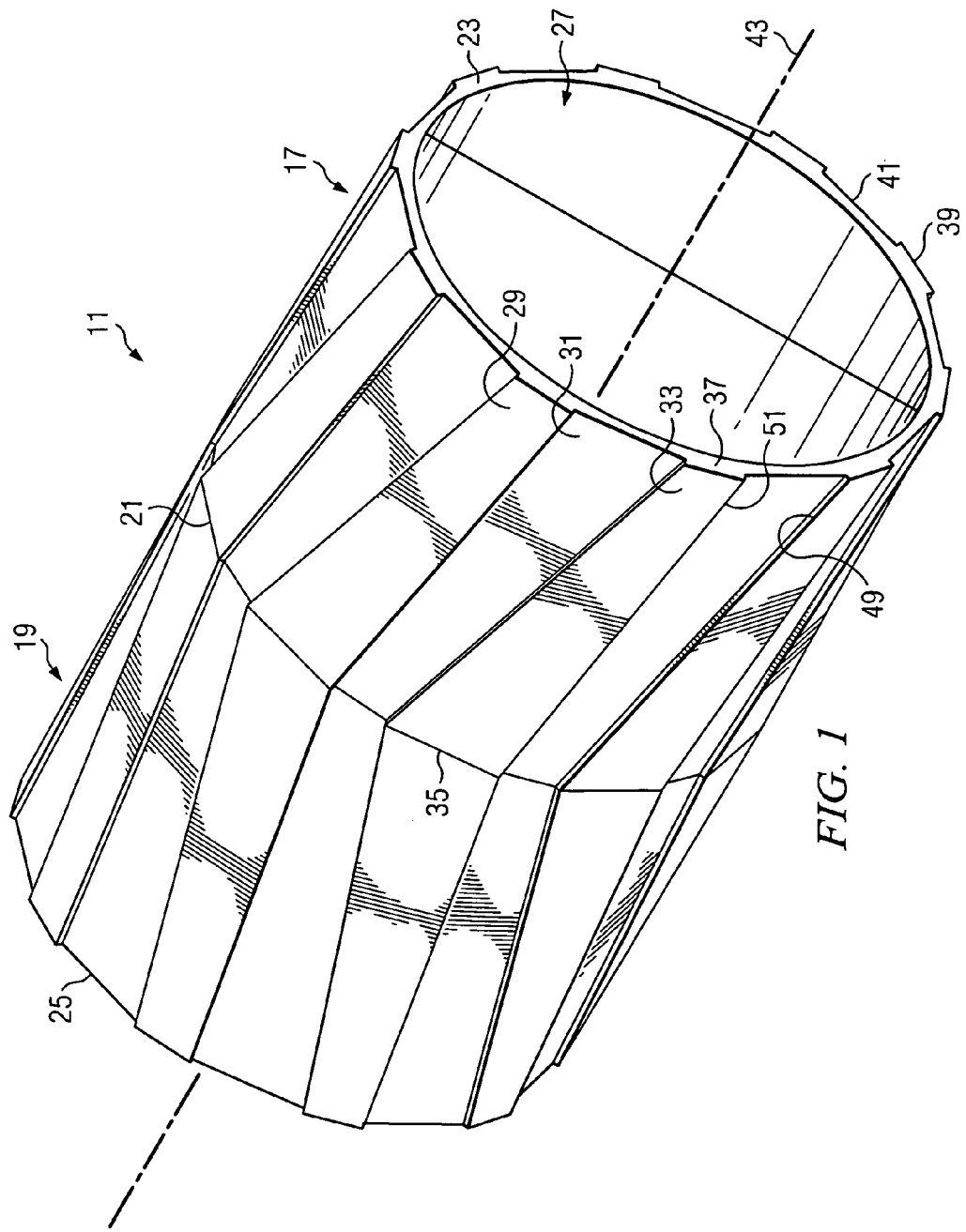
FIG. 1 is a perspective view of one version of a coupling used in the tubular connector system of the invention in which the coupling has specially contoured surfaces on the exterior of the tapered ends thereof.

Turning to FIG. 1, there is shown a push together coupling of the invention, designated generally as 11. The coupling is used to join two sections of pipe such as the sections represented by the opposing box pipe ends 13, 15 in FIG. 2. As shown in FIG. 1, the coupling body has a first tapered end 17 and a second tapered end 19 which are joined together at a respective inner extent 21 thereof. Each of the tapered ends 17, 19 slopes inwardly from the inner extent 21 to an outer extent 23, 25 thereof to thereby form a respective mouth opening of the body, such as mouth opening 27.

Figure 2:
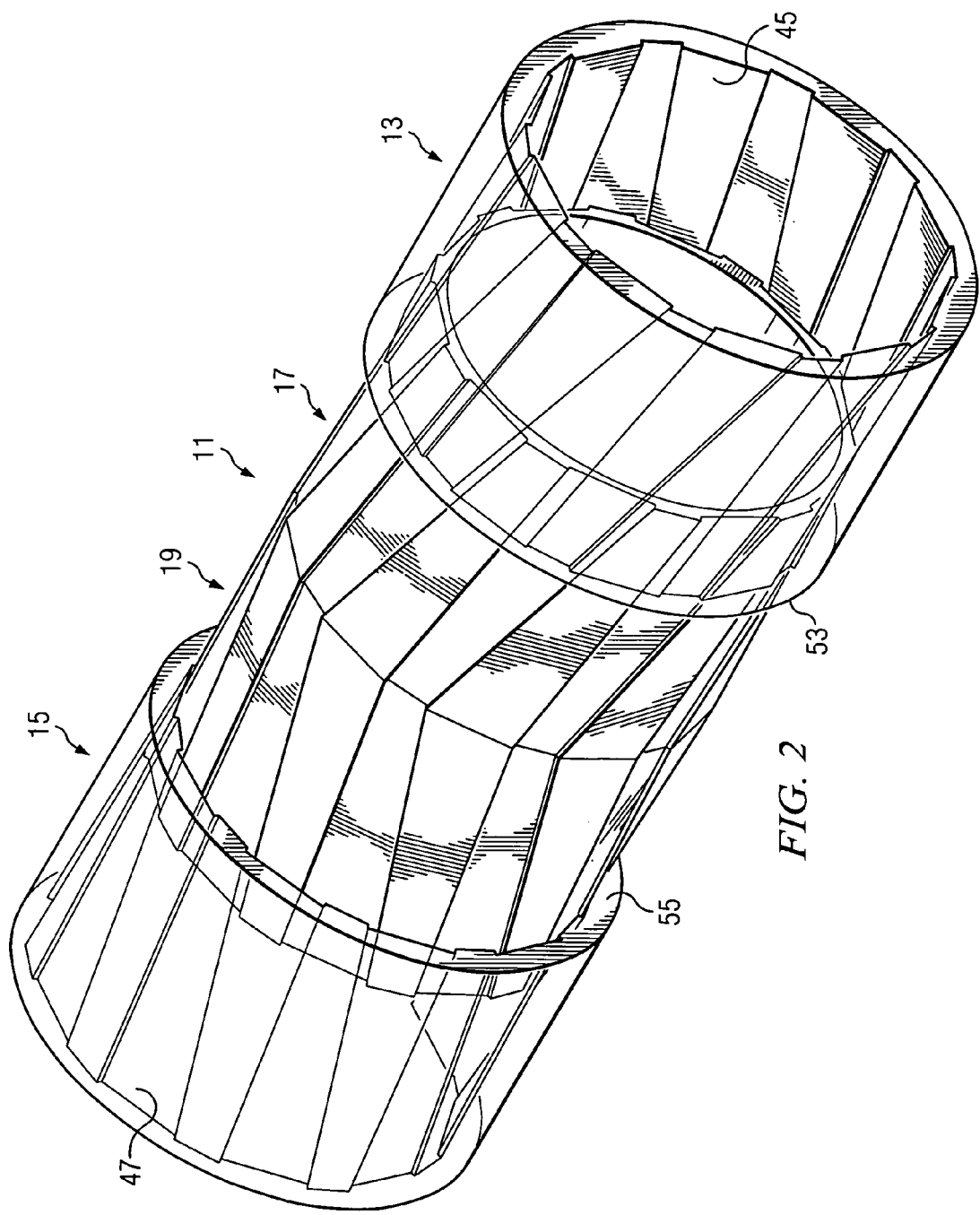
FIG. 2 is a partly schematic view of the coupling of FIG. 1 being used to join two opposing box pipe ends, the pipe ends being shown in partly transparent fashion for ease of illustration.

In the version of the invention illustrated in FIGS. 1 and 2, each of the first and second tapered end 17, 19 has a specially contoured exterior surface. The exterior surface is made up of a plurality of "helical spline wedges" such as wedges 29, 31, 33 illustrated in FIG. 1. These specially designed "wedges" are partly in the form of a thread and partly in the form of a spline. Each of the wedges is oppositely tapered from an inner extent 35 to an outer extent 37 thereof, whereby the helical spline wedges form an alternating series of lands 39 and grooves 41 on the exterior surface of the body as viewed from the respective mouth openings 27.

Figure 7:
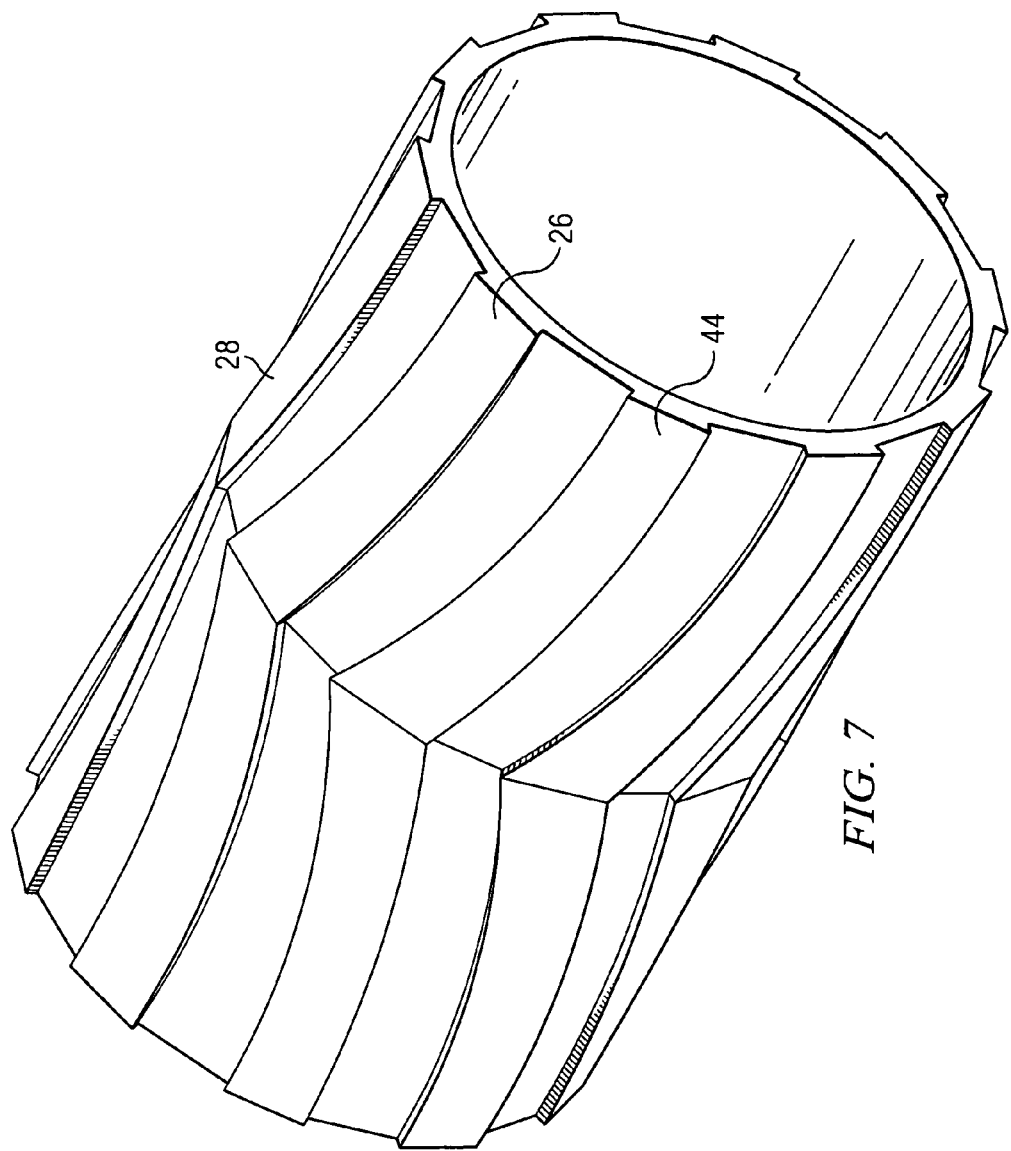
FIG. 7 is a perspective view of a coupling of the invention in which the helical spline wedges which make up the specially contoured surfaces of the exterior of the coupling are shown in somewhat exaggerated fashion for ease of understanding.
Figure 8:
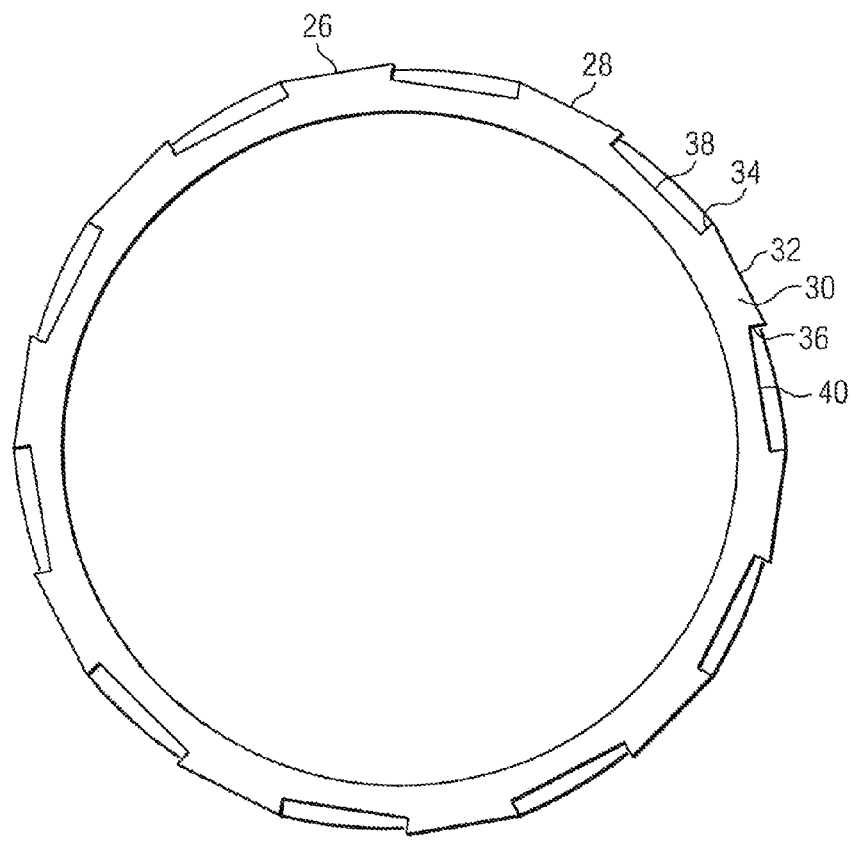
FIG. 8 is an end view of the coupling of FIG. 7 showing the dovetail nature of the cross section of each of the helical spline wedges.
Figure 9:
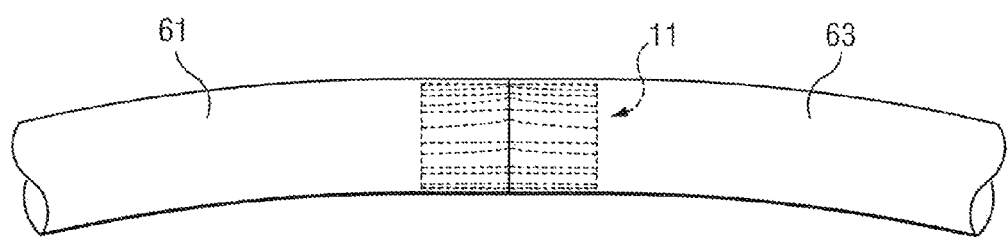
FIG. 9 is a close up view of a portion of the pipe segments of FIG. 5 which make up the support structure for the tunnel segments shown in FIG. 5.

FIGS. 7 and 8 illustrate the first form of the coupling of the invention in which certain features have been shown in somewhat exaggerated fashion for ease of illustration. Note particularly in FIGS. 7 and 8, that in the end views, the raised spline wedges are "dovetailed" in cross section. That is, with reference to FIG. 8, the spline wedge 30 has a crest 32 and opposing flanks 34, 36. The flanks 34, 36 are inclined inwardly in the direction of the flat or root regions 38, 40. In other words, the width of each individual spline crest (such as crest 32) is greater than the width of the spline at the base or root region thereof. It is the dovetail nature of the helical wedge splines that hold the connection together radially upon make-up.

By helical spline "wedges" is thus meant an element of the connection which features mating helical surfaces which are tapered in width in opposite directions to provide wedge-like engagement of the opposing flanks of the coupling and the pipe end being made up. In other words, both the elements 26 and 28 in FIG. 7, and the mating corresponding structure of the pipe ends being made up with the coupling, are machined as helical wedges and thus have progressively changing axial width along the helical length thereof to provide a wedge-like interfit upon make-up of the connection.

The specially contoured exterior surfaces of the coupling 11 resemble a "spline" in that they form alternating lands and grooves 39, 41. They also resemble a spline in that the respective wedges 29, 31, 33 are arranged on the exterior surface of the coupling 11 along a dominant axis 43, the dominant axis being longitudinal or axial rather than helical, as in the case of a typical thread. Conversely, however, even though the wedges are aligned predominately along a longitudinal axis 43, as will be explained in greater detail, there is a radial component of movement during makeup of the pipe connection. This radial component of movement gives the specially contoured surfaces of the coupling a "thread" or helical aspect. The common definition of a helix is a smooth curve in three dimensional space where a tangent line at any point makes a constant angle with a fixed line called the axis of the helix. Examples of helices are coil springs and the handrails of spiral staircases. Most hardware screw threads are right handed helices. In this sense, the connection can be thought of as a "helical" wedge spline connection. Because of the helical wedge spline design, the pipe ends can be on the order of 5° off in alignment with the coupling with a successful connection still being achieved.

However, as will be appreciated from FIG. 7, because the specially contoured exterior surface of the coupling of the invention has a "hybrid" type nature in sharing the characteristics of both a spline and a helix, the particular elements (such as elements 26, 28 in FIG. 7) are somewhat curved or skewed in nature.

As shown in FIG. 2, the first and second tapered ends 17, 19 of the coupling 11 are sized or shaped appropriately to be received on mating internal surfaces 45, 47 provided on the respective box ends of the two pipe sections 13, 15 to be joined. As will be appreciated with respect to FIG. 2, an assembly force must be applied to the coupling 11 in order to form a connection between the two pipe sections 13, 15. The assembly force causes the coupling 11 to rotate less than 360° before the ends 13, 15 are fully connected. In the case of the connection shown in FIG. 2, the fully connected joint will have the box ends of the pipe sections, 13, 15, touching when the connection is made-up. It is also preferable during the assembly that the respective roots and crests of the tapered surfaces (17, 19 in FIG. 1) make contact first, with contact of the flanks occurring next. In the case of the present invention, the assembly force to achieve full connection causes the coupling to rotate less than 90°, preferably less than about 45°, for example 36°, and in some cases even less than about 30° before the pipe ends are fully connected. Connections have been achieved, for example, with as little as one tenth turn to make-up. This assembly force is preferably achieved without the necessity of a heating step to cause relative expansion of the pipe ends, and preferably without the necessity of the use of an adhesive compound being applied between the parts being joined. Note also, that while the pipes being joined might have a curved aspect for directional drilling or the like, that one advantage of the invention is the fact that the pipe sections and associated coupling are made-up with only axial movement of the pipe ends, rather than radial movement. This complete absence of radial movement will be an advantage in many situations.

It is, of course, possible that a coating of epoxy, or other conventional sealant, could be applied to either the pipe ends or the coupling before the pipe ends are pressed into the coupling sleeve and the joint is made-up. The epoxy would provide some lubricity during the assembly and also act as a seal against corrosion of the pipe ends. Once a pipe joint is formed, a thin bead of epoxy, or similar sealant, can be applied around the ends of the coupling to provide enhanced corrosion protection in situations where this extra step is deemed necessary.

As can be seen in FIGS. 1 and 2, the connection is preferably achieved in part by frictional contact and resistance relative to bodily displacement of the axially tapered surfaces on the respective inner and outer contact surfaces of the coupling, the frictional surfaces being interengaged in direct physical contact, with a desired contact pressure there between along an interface which is substantially continuous and tapers substantially uniformly along the axial length of frictional engagement between the tapered surfaces.

Preferably, the strength of this frictional aspect of the engaged coupling against bodily displacement of the tapered surfaces of the component parts approaches the yield strength of the pipe sections being connected. It is important that none of the connections fail in use, for example in oil well tubing strings, if higher stresses are experienced in the string as with transients, or the like. In some cases, it will be desirable that axial tension loads, for example, approaching the yield strength of the tubing string be achieved without failure of the pipe joints thereof.

As far as the actual length of the interface of the tapered surfaces of the connections, the taper angle will generally be relatively small, for example 18°, but can vary throughout a workable range with angles as steep as 36°, for example. It will also be desirable to generally provide the pipe joints with a relatively high effective coefficient of friction between the tapered surfaces making contact in making-up the connection. By increasing the coefficient of friction between the surfaces, it may be possible to decrease the length of the interface surfaces of the connection. These factors can be related so as to produce a connection with a joint strength which approaches the yield strength of the pipes being joined.

It is also possible in some variations of the methods of the invention that one of the members of the connection may be shrunk or expanded relative to the other, either hydraulically, or otherwise. In other words, the outer member might be, for example, hydraulically shrunk with respect to the inner member to achieve the maximum possible engagement pressure between the components of the connection being joined. Alternatively, an expandable pig or the like might be used to expand the inner member relative to the outer member.

With respect to the axial length of the interface surfaces, such as the tapered ends 17, 19 shown in FIG. 2, and as measured along the longitudinal axis 43 in FIG. 1, and the mating internal surfaces such as surfaces 45, the preferred axial interface length will tend to be at least about 0.50 times the outside diameter of the body of the pipes being joined to obtain the best joint strength. However, the maximum axial length of the interfaces surfaces could be as much as about 2.0 times the outside diameter of the section of pipe, or more, without being excessive for some situations. Preferably, the length will not be more than about 1.5 times the outside diameter of the pipe section.

It will be appreciated, however, that these preferred lengths can be minimized to some extent depending upon the coefficient of friction between the contact surfaces thereof. With pipe materials used in the oil and gas industries for tubing and couplings, the surface roughness will normally produce a coefficient of friction of around 0.20. However, in some situations, the coefficient may be as low as 0.10 or even lower. However, higher coefficients of friction, on the order of 0.80 may be achieved, as by the use of a burred interface surface, or other roughening techniques, as will be explained hereafter. These techniques include etching, knurling, sand blasting, plating so as to roughen, or physical keys or burrs, and the like on the contact surfaces. The included angle of the tapered surfaces (17, 19 and 45, 47 in FIG. 2) also enters into the calculation of the preferred axial length engagement of the respective surfaces by reducing or conversely increasing the effect of the coefficient of friction. As has been mentioned, the included taper angle will generally be on the order of 1 to 20°, e.g., 18°, but may approach a steeper angle, e.g., 36°, in some situations.

Figure 4:
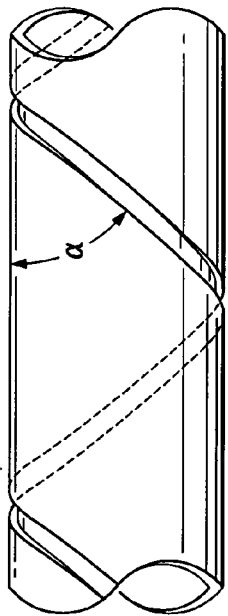
FIG. 4 is a simplified schematic illustration of a thread on a tubular body illustrating the definition of a thread versus a spline.

FIG. 4 is a simplified representation which further illustrates the combined spline/thread nature of the helical spline wedges of the invention, as opposed to the various types of threaded connections of the prior art. As has been discussed, the wedge surfaces are acted upon by an assembly force causing the coupling to move primarily along a longitudinal or axial path of travel. With a typical thread form of pipe connection, the dominant axis is normally helical. There are also not as many turns per inch with the special helical spline wedges of the invention as compared to a normal thread form. FIG. 4 is intended to be a simplified representation of a thread form of a tubular connection. Thus, with respect to FIG. 4, the angle α is approximately 45°. For an angle generally less than almost 45°, more of a push connection is achieved. Where the angle α is greater than about 45°, more of a torque force connection results. In the case of α is equal to 0°, a pure spline connection results.

In order to makeup the connection, a selected coupling end 19 is first inserted approximately halfway into the mating pipe end 15. The coupling is generally free stabbing until about the halfway point, at which resistance is encountered from the wedge lands and grooves making contact. In the preferred design, the lands and grooves contact first before the respective 49, 51 make contact. The second pipe end 13 is then pushed in the direction of the first pipe end as with a hydraulic tool. For the ten start coupling illustrated in FIG. 1, the coupling rotates approximately 36° radially during makeup before the pipe outer extents 53, 55 make contact. Contact between the pipe ends 53, 55 and engagement with the coupling 11 is achieved without any rotation or torque of the respective pipe ends 13, 15.

Figure 3:
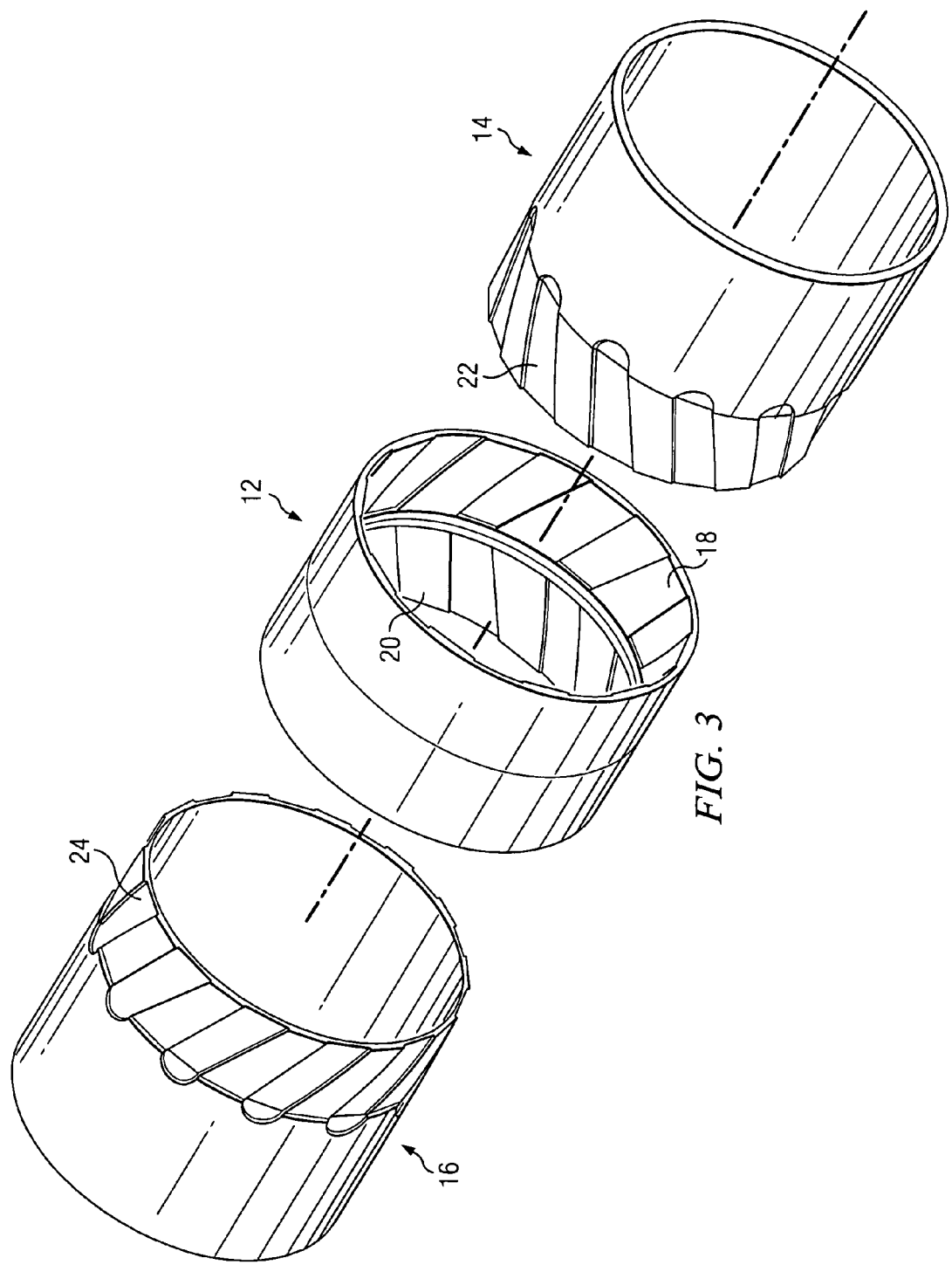
FIG. 3 is an exploded view of another version of the coupling of the invention in which the coupling has the specially contoured surfaces on the interior of the tapered ends thereof for mating with specially contoured exterior surfaces on the pin ends of the two pipes to be joined.

FIG. 3 shows another version of the connection system of the invention in which the specially contoured surfaces on the coupling 12 and opposing pipe ends 14, 16 are essentially reversed. That is, the helical spline wedge surfaces 18, 20 on the coupling 12 are one the interior of the first and second tapered ends. Similarly, the respective opposing pipe ends to be joined 14, 16 are "pin" ends having specially contoured exterior helical spline wedge surfaces 22, 24. The makeup of the connection is in other respects identical to that previously described.

Figure 5:
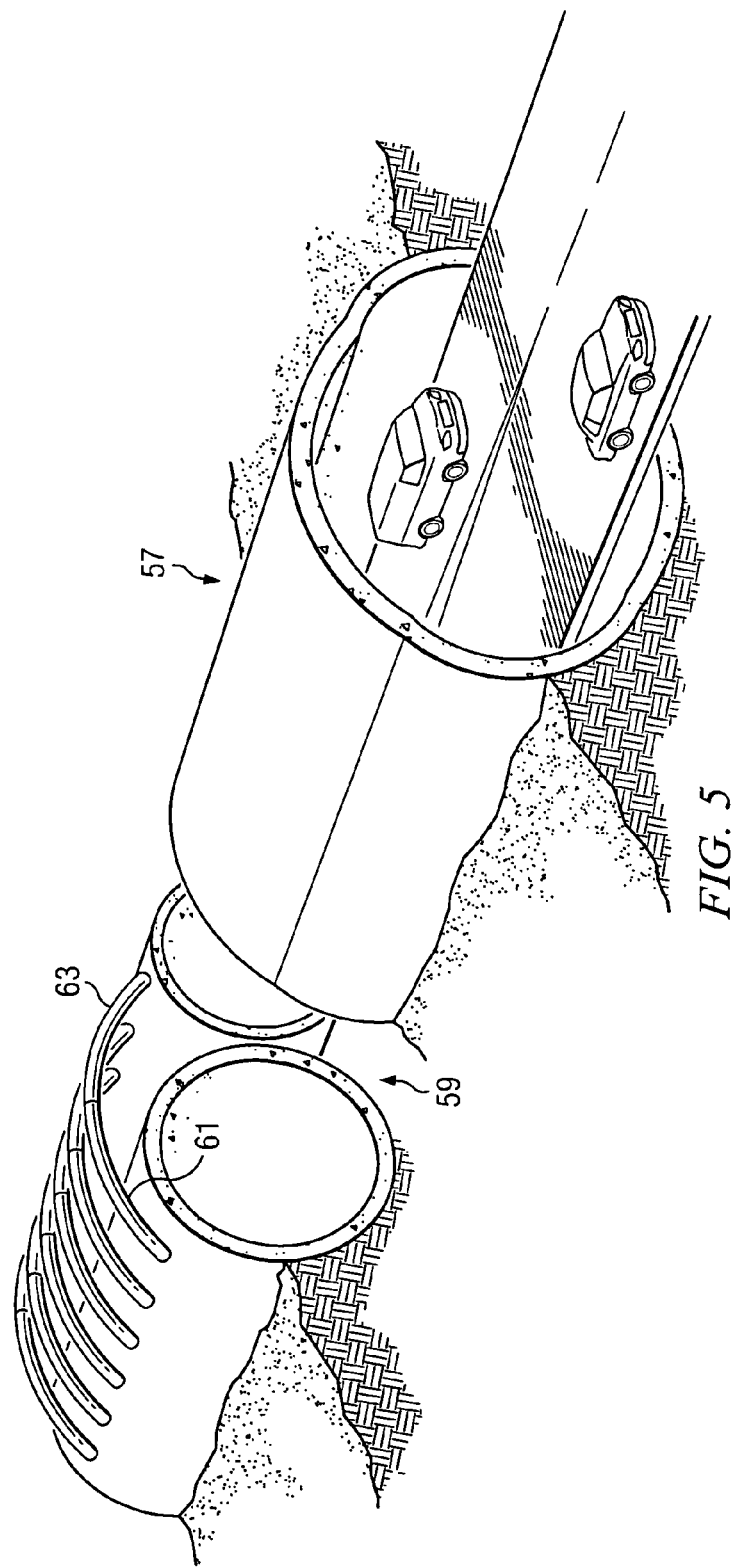
FIG. 5 is a simplified view of an underground transportation tunnel using a whalebone superstructure for reinforcement, the superstructure being comprised of tubular pipe segments joined end to end in an semi-arcuate arrangement.

FIG. 5 is a simplified illustration of a tunnel system including tunnel segments 57, 59 of poured concrete. The tunnel segment 59 has a supporting super structure comprised of a "whalebone" arrangement of tubular pipe segments 61, 63. In the example illustrated in FIG. 5, each pipe segment 61, 63 is approximately ten feet long and has an OD of approximately 32 inches. The pipe segments are joined end to end, as previously described, in order to each make a "whalebone" section with the pipe segments being arranged along a semi-arcuate, curved axis. The pipe interiors and surrounding void is then typically filled with concrete. The improved push-together coupling of the invention can be used to quickly and efficiently assemble the tunnel segments described.

Figure 6:
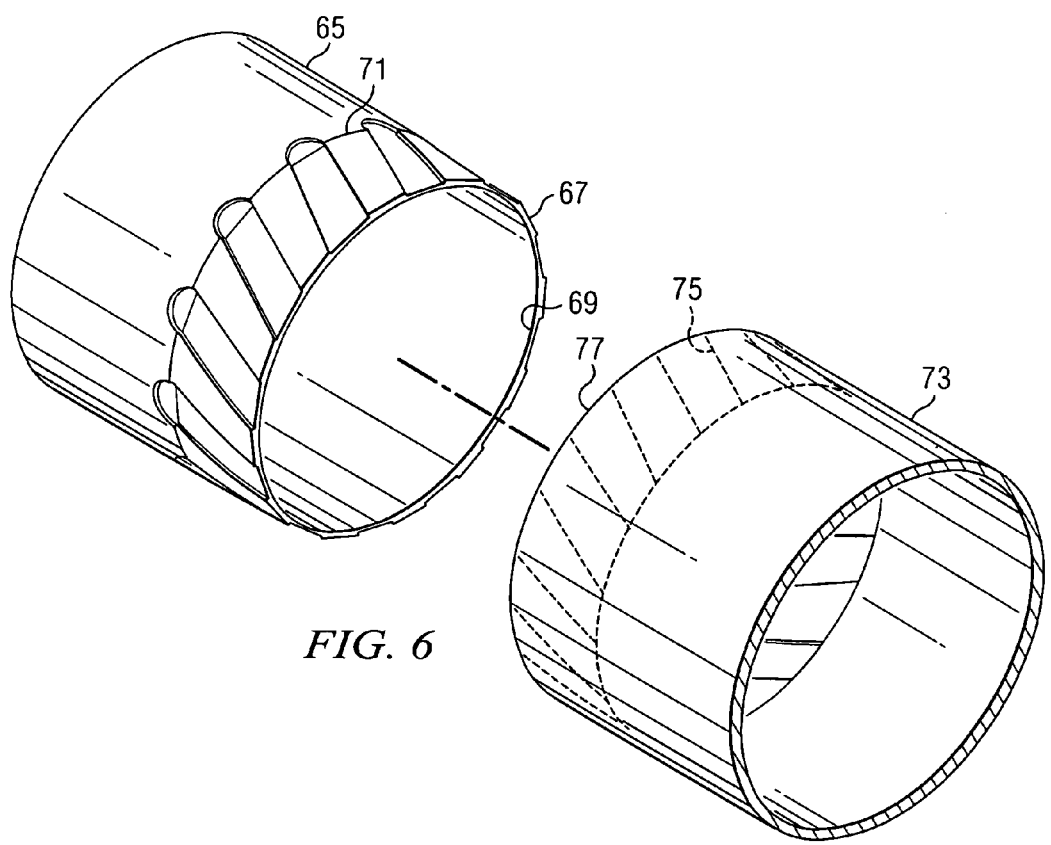
FIG. 6 is a view of another version of the pipe connection system of the invention in which a flush push joint is utilized.

FIG. 6 illustrates another version of a push-together pipe assembly of the invention which is used for joining two pipe sections with only a partial rotation of one of the sections. The pipe assembly shown in FIG. 6 is made up of a first pipe 65 having a first tapered end 67 with an inner extent 69 and an outer extent 71. The tapered end 67 slopes inwardly from the outer extent 71 in the direction of the inner extent 69 thereof to thereby form a respective mouth opening of the first pipe. As has been described with respect to FIGS. 1-2, the first pipe tapered end 67 has a specially contoured external engagement surface, the engagement surface being comprised of a plurality of helical spline wedges, each of which is oppositely tapered from an inner extent to an outer extent thereof in width, whereby the helical spline wedges form an alternating series of lands and grooves as viewed from the respective mouth openings.

The push-together pipe assembly of FIG. 6 also includes a second pipe 73 having a specially contoured engagement surface on an inner extent thereof, the second pipe engagement surface being sized to be matingly engaged with the first pipe engagement surface, whereby the respective pipe ends may be joined by axial movement of one pipe relative to another. In the version of the invention shown in FIG. 6, the second pipe 73 has a "box" end 77 with the specially contoured surfaces being on the interior (shown in dotted lines as 75) of the pipe end adjacent the mouth opening. The specially contoured surfaces on the first pipe end are on the exterior thereof so that it constitutes a "pin" end. The axial movement of one pipe 65 relative to the other 73 causes a slight rotation of one pipe relative to another. The rotation will be relatively slight, amounting to less than 360°, or one complete turn. It will be understood, as has been explained with reference to FIGS. 1 and 3, that the positions of the specially contoured surfaces on the pipe ends could be reversed, i.e., so that the first pipe 65 is a box end and the second pipe 73 is a pin end. As has been described with respect to the earlier versions of the invention, the helical spline wedges are arranged on the specially contoured surface of the selected pipe end along a dominant axis, the dominant axis being longitudinal rather than helical.

An invention has been provided with several advantages. In one version of the system of the invention, the push-together connection of the invention allows two pipe sections to be joined without the necessity of rotating the pipe sections. This can be particularly advantageous in applications such as surface line pipe connections, undersea pipe systems and tunnel super structure supports. The coupling is relatively simple in design and economical to manufacture. Previous connections systems requiring welding of the pipe ends required on the order of five hours per connection where as the connection system of the invention can be made up in about five minutes or less. The multiple wedge segments forming the specially contoured surfaces of the coupling assist in holding the opposing pipe ends together to keep them from inadvertently separating. That is, multiple wedge surfaces are present at the connection unlike a regular threaded connection in which the thread runs out at the outer extent of the pipe ends. The additional contact area provides a more secure connection overall.

In another version of the system of the invention, the push-together connection of the invention allows two pipe sections to be joined with only a slight rotation of one pipe relative to the other. This can be particularly advantageous in applications such as construction, oil and gas and mining, where a slight rotation of one or both pipes being joined may be acceptable. Such a connection system can be used advantageously for drive pipe, riser pipe, conduit and casing liners for oil and gas production, for example.

While the invention has been shown in only two of its forms, it is not thus limited but is susceptible to various changes and modifications without departing from the spirit thereof.

What is claimed is:

1. A support structure for a tunnel segment of poured concrete, where the tunnel segment makes up a part of a tunnel system, each tunnel segment having a supporting super structure made up of a series of coupled tubular pipe segment assemblies, each coupled pipe segment assembly comprising:
   a first pipe having a box end with an interior and with a specially machined interior surface;
   a second pipe having a box end with an interior and with a specially machined interior surface;
   a coupling body having a first tapered end and a second tapered end joined together at a respective inner extent thereof, each of the tapered ends sloping inwardly from the inner extent to an outer extent thereof to thereby form a respective mouth opening of the body;
   wherein each of the first and second tapered ends has a specially contoured exterior surface, the exterior surface being comprised of a plurality of helical spline wedges, each of which is oppositely tapered from an inner extent to an outer extent thereof in width, whereby the helical spline wedges form an alternating series of lands and grooves on the exterior surface of the body as viewed from the respective mouth openings;
   wherein each of the helical spline wedges has a dovetail shape when viewed in cross section;
   the first and second tapered ends being shaped to mate with the specially machined surfaces provided within the box ends of the first and second pipes, respectively, to engage the respective pipe ends by axial movement of one pipe relative to another and without rotating the respective first and second pipes;
   whereby the box ends of the first and second pipes touch upon completion of the connection with the coupling being completely received within the interior of the first and second pipes, respectively; and wherein the coupled tubular pipe segments are arranged along a curved axis when assembled as a part of the supporting super structure of the tunnel system.

2. The support structure for a tunnel segment of claim 1, wherein an assembly force is applied to the coupling in order to form a connection between two pipe sections, and wherein the assembly force causes the coupling to rotate less than 360° before the pipes are fully connected.

3. The support structure for a tunnel segment of claim 1, wherein the helical spline wedges are arranged on the specially contoured surface of the coupling along a dominant axis, the dominant axis being longitudinal rather than helical.

4. The support structure for a tunnel segment of claim 1, wherein an assembly force is applied to the coupling in order to form a connection between two pipe sections, and wherein the assembly force causes the coupling to rotate less than 45° before the pipes are fully connected.

5. The support structure for a tunnel segment of claim 1, wherein the first and second tapered ends of the coupling body each have a given axial length as measured along a central longitudinal axis of the coupling body, and wherein the axial lengths are at least about 0.5 times the outside diameter of the respective pipe bodies being joined and less than about 1.5 times the outside diameter of the pipe body being joined.

6. The support structure for a tunnel segment of claim 1, wherein the first and second tapered ends of the coupling body each have a given axial degree of taper with respect to a central longitudinal axis of the coupling body, and wherein the given axial degree of taper is in the range from 1 to 36°.

7. The support structure for a tunnel segment of claim 1, wherein the first and second tapered ends of the coupling body each have a given axial degree of taper with respect to a central longitudinal axis of the coupling body, and wherein the given axial degree of taper is in the range from 1 to 20°.

* * * * *